May 9, 1939. J. H. WILLIAMS 2,157,274
WELDING T AND METHOD OF MAKING SAME
Filed April 27, 1937

JAMES HOWARD WILLIAMS
INVENTOR.

BY Harry Dexter Peck
ATTORNEY

Patented May 9, 1939

2,157,274

UNITED STATES PATENT OFFICE 2,157,274

WELDING T AND METHOD OF MAKING SAME

James Howard Williams, Providence, R. I., assignor to General Fire Extinguisher Company, Providence, R. I., a corporation of Delaware Application April 27, 1937, Serial No. 139,151

2 Claims. (Cl. 29—157)

This invention relates to improvements in welding T's and method of welding them to a pipe.

One method of making a welding T is to start with a suitable piece of pipe and form an outlet or nozzle on the side thereof from the material of the pipe itself. To thus draw out the material of the pipe wall and obtain a suitable wall thickness for the nozzle, it is essential that the pipe used for the T have a wall thickness greater than the pipe to which the T is ultimately to be welded. But when the end of such a T is presented to a pipe considerable difficulty is experienced in accurately aligning the two so that their inner surfaces may constitute a smooth passageway.

It is an object of this invention to form the end of a welding T, having a wall thickness greater than that of the pipe to which it is to be welded, in such manner that an aligning tool may be applied externally to the pipe and T and effect accurate alignment of their inner surfaces.

The best mode in which I have contemplated applying the principles of my invention is shown in the accompanying drawing but these are to be taken as merely illustrative because it is intended that the patent shall cover by suitable expression in appended claims whatever features of patentable novelty exist in the invention disclosed.

Figure 1:
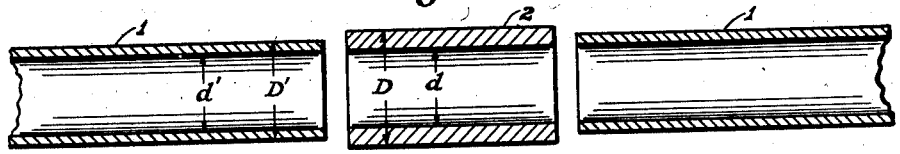
Figure 1 is a sectional view through two pipes and a piece of another pipe from which a welding T is to be formed and ultimately welded to the ends of the two pipes.
Figure 2:
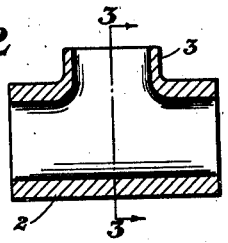
Figure 2 is a sectional view of the piece of pipe after the side outlet or nozzle has been drawn out from the wall thereof.
Figure 3:
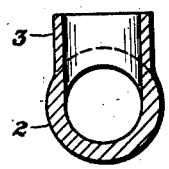
Figure 3 is another sectional view taken as on line 3—3 of Figure 2.
Figure 4:
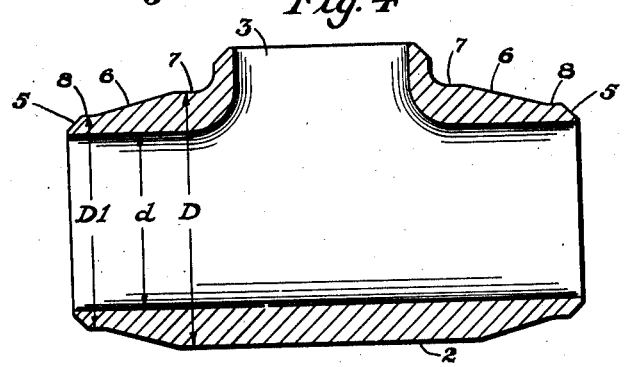
Figure 4 is another sectional view on larger scale showing the welding T after it has been formed in accordance with the present invention.

Referring more particularly to the drawing, Figure 1 shows the relative sizes of two pipes I and a pipe section 2 from which a welding T is to be formed and later welded to the pipes. The inner diameter d' of each pipe and the inner diameter d of the said section are substantially the same. But the external diameter D of the section is appreciably greater than the external diameter D' of the pipe because the section has a much thicker wall. This is desirably so because the side outlet or nozzle 3 of the T is formed from the material of the pipe, it being drawn out as clearly seen in Figures 2 and 3. During this drawing operation the material in the nozzle becomes thinner so that its finished wall is substantially the same thickness as that of a pipe to which it may later be welded. But the remaining ends of the T are thus far unchanged and it is difficult to align them with a pipe so that the inner surfaces at their junction will present no deflection from a smooth continuous surface.

Heretofore it has been customary to provide a short chamfer 4 (see Figure 5) at the extreme end of the pipe and another such chamfer 5 at the end of the T, such chamfers usually being at an angle of about 45°. From the inner edge of this 45° chamfer on the T, another chamfered portion 6 has extended to the normal outer surface 7 of the pipe, this latter chamfered portion being about 15°. All such chamfered surfaces have been of no assistance, however, in accurately aligning a pipe and T preparatory to welding.

To provide for such desired accurate alignment the present invention contemplates the formation of a straight cylindrical surface 8 on the outer surface of the T near the end to be welded. This cylindrical surface 8 begins at the inner edge of the usual short 45° chamfer 5 and extends a short distance parallel to the longitudinal axis of the T. It is then followed by the usual long gentle sloping chamfer 6 which terminates at the normal outer surface 7 of the T. The diameter D1 of this cylindrical surface 8 is designedly made substantially the same as the external diameter D' of the pipe to which the T is to be welded.

Figure 5:
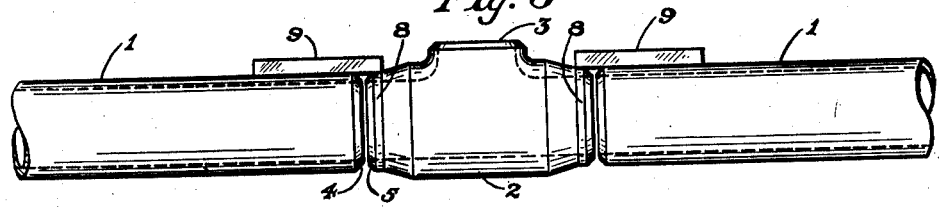
Figure 5 is an elevation of two pipes with the welding T between them, showing how the T may be accurately aligned with the pipes preparatory to welding.
Figure 6:
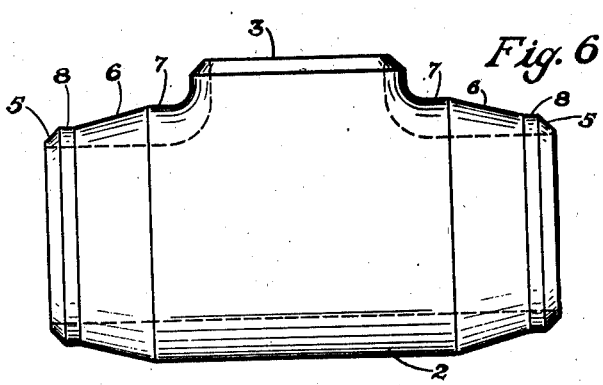
Figure 6 is a side elevation of the improved T constructed in accordance with the present invention.

Preparatory to welding, the pipe I is presented to the improved T as shown in Figure 5 and an aligning tool 9, such as for example the straight edge shown, is laid on the outer surface of the pipe end on the prepared cylindrical surface 8 of the T. Since these two surfaces are of substantially the same diameter and equi-distant from the longitudinal axes of the pipe and T, the inner surfaces of the two, adjacent the aligning tool, will be in accurate alignment. Having thus aligned one side of the pipe and T, suitable precaution is taken to maintain them in their aligned relation while the aligning tool is placed at some other location around the pipe and the cylindrical surface of the T. When the outer surface of the pipe and the cylindrical surface of the T are in alignment at this new location, and the former aligned relation has not been shifted, the inner surfaces of the pipe and the T are in accurate alignment. The pipe and T may then be welded together, preferably by first "tacking" them together at separated points around the adjacent edges and then by completing the welding all around.

It is to be understood that in thus aligning the pipe and the T their adjacent edges are not butted together but a suitable space is left so that as the material cools and shrinks after the welding is done the extreme edges of the pipe and T will not exert sufficient pressure on one another to cause high residual stresses in the weld.

I claim:

1. A T for welding made from a section of pipe having an extra thick wall for its internal diameter, a nozzle drawn from the wall of said section having a wall thickness corresponding to the standard wall thickness for the internal diameter of said nozzle, a chamfer on the edge of said nozzle for purposes of welding, a chamfer on the edge of each leg of the T for purpose of welding, and a cylindrical surface on each said leg beginning at said chamfer and extending toward said nozzle; the thickness of the T wall at said cylindrical surface corresponding to the standard wall thickness for the internal diameter of the leg.

2. The method of preparing a T fitting from a section of pipe having an extra thick wall for its internal diameter which comprises drawing a nozzle on one side of the section so that the thickness of the wall of said nozzle corresponds to the standard wall thickness for the internal diameter of the nozzle, cutting an external chamfer around the edge of said nozzle for purpose of welding, cutting a similar external chamfer around the edge of each aligned leg of the T for purpose of welding, and cutting a flat cylindrical surface on the outer surface of each said leg, beginning at the end of its said external chamfer and extending toward the nozzle, to reduce the thickness of the T wall at said cylindrical surface to correspond with the standard wall thickness for the internal diameter of the leg.

JAMES HOWARD WILLIAMS.